United States Patent
Ancin et al.

(10) Patent No.: US 7,664,821 B1
(45) Date of Patent: Feb. 16, 2010

(54) SYSTEMS AND METHODS FOR DETERMINING COMMUNICATION CHAINS BASED ON MESSAGES

(75) Inventors: Hakan Ancin, San Jose, CA (US); David Bayer, Mountain View, CA (US); Kumar Maddalli, Santa Clara, CA (US); Joy Thomas, Sunnyvale, CA (US)

(73) Assignee: Stratify, Inc., Mountain View, CA (US)

( * ) Notice: Subject to any disclaimer, the term of this patent is extended or adjusted under 35 U.S.C. 154(b) by 275 days.

(21) Appl. No.: 11/627,886

(22) Filed: Jan. 26, 2007

Related U.S. Application Data

(60) Provisional application No. 60/763,199, filed on Jan. 26, 2006.

(51) Int. Cl.
*G06F 15/16* (2006.01)
(52) U.S. Cl. .................... 709/206; 715/734
(58) Field of Classification Search ............... 709/206; 715/734
See application file for complete search history.

(56) References Cited

U.S. PATENT DOCUMENTS

| | | | |
|---|---|---|---|
| 6,888,548 B1 | 5/2005 | Gallivan | |
| 7,035,876 B2 | 4/2006 | Kawai et al. | |
| 7,191,175 B2 | 3/2007 | Evans | |
| 7,271,804 B2 | 9/2007 | Evans | |
| 7,359,894 B1 * | 4/2008 | Liebman et al. ............. 707/3 |
| 2002/0073159 A1 * | 6/2002 | Jain ............................ 709/206 |
| 2002/0087641 A1 * | 7/2002 | Levosky ..................... 709/206 |
| 2005/0193076 A1 * | 9/2005 | Flury et al. ................. 709/206 |
| 2006/0075051 A1 * | 4/2006 | Jain et al. ................... 709/206 |
| 2006/0173957 A1 * | 8/2006 | Robinson et al. ........... 709/204 |

* cited by examiner

*Primary Examiner*—William C Vaughn, Jr.
*Assistant Examiner*—Boris Gorney
(74) *Attorney, Agent, or Firm*—Townsend and Townsend and Crew LLP

(57) ABSTRACT

A pool of messages, e.g., e-mails and/or other electronic documents that each correspond to a communication from a sender to a recipient, is analyzed to identify communication chains between a source and a target. Sender and recipient identifiers extracted from the messages are used to detect communication links between pairs of entities. Indirect chains of any desired length can be found by iteratively tracing a communication path one step forward from the source, then one step backward from the target, and so on; at each new step, entities at end points of the forward paths and backward paths are compared to detect any entities that complete a communication chain from source to target. Information related to the identified communication chains can be presented to a user via an interactive report that supports iterative analysis of the communication-chain data.

24 Claims, 6 Drawing Sheets

SYSTEMS AND METHODS FOR DETERMINING COMMUNICATION CHAINS BASED ON MESSAGES

CROSS-REFERENCES TO RELATED APPLICATIONS

This application claims the benefit of U.S. Provisional Application No. 60/763,199, filed Jan. 26, 2006, entitled "Techniques for Determining Communication Chains," which disclosure, including Appendix A attached thereto, is incorporated herein by reference for all purposes.

The present disclosure is related to commonly-assigned co-pending application Ser. No. 11/627,890, filed of even date herewith.

BACKGROUND OF THE INVENTION

The present invention relates in general to analysis of information items and in particular to systems and methods for determining communication chains between parties from electronic records.

With the proliferation of computing devices and communication networks such as the Internet, an ever increasing amount of information is exchanged in electronic forms such as e-mails (electronic mail messages), instant messages (IMs), electronic document memos, etc. Electronic communication forms generally provide simple and easy to use, yet powerful, mechanisms for communication of information. To take just one example, the use of e-mail provides a number of advantages over traditional communication techniques such as phone and fax-based communications, including cheaper cost, reduced delivery time, ability to handle multiple document formats, and archival capabilities.

E-mails are usually stored in databases including mail specific databases such as Microsoft Exchange or Lotus Notes. Given the critical nature of corporate data, e-mails are usually backed up regularly on to backup media. The fact that e-mails can be and are archived coupled with the fact that users tend to be more direct and forthright about information in e-mails make them excellent candidates for analysis for legal purposes.

While the potential dangers of discovery of "harmful" e-mails have caused some companies to introduce policies to destroy old e-mails and backups, most companies still maintain backups of old e-mails for at least some period of time (usually for a few years). Further, government regulations (e.g., Sarbanes-Oxley at the federal level) require may companies to maintain such e-mail backups for an extended period of time (e.g., several years).

At present, other types of electronic communications are less likely to be archived; however, companies are beginning to archive more types of communications, particularly for regulatory compliance purposes. For example, many companies have begun to archive IMs and/or voice mail messages. Companies are also adopting electronic forms of more traditional types of communications, such as internal memoranda and letters, which are often circulated in file formats such as PDF, Microsoft Word, or the like, and documents in these formats often are archived. With the growth of electronic calendar systems, teleconferencing, video conferencing, and Web conferencing, electronic records of when meetings occurred and who was in attendance may also become increasingly available in the future.

When a company is involved in a lawsuit, counsel on both sides typically search the company's records for evidence of activity that might prove liability or exculpate the company. Even in the absence of a lawsuit, corporate counsel might want to examine communication records for evidence of a crimes or other activities for which the company might be held liable or to satisfy reporting requirements as to the lack of such activity. Typically in such situations, e-mail archives and document archives are searched for particular keywords, senders and receivers, and the search results are manually reviewed by a human. For example, the lawyers involved in a lawsuit might look for critical documents and/or e-mails, then try to trace the path of the documents and/or e-mails through the system to establish when critical pieces of information became known to certain people within the company. Commonly asked questions related to communications include: Who within the company knew about a certain piece of information? When did the person know it? Who conveyed the information to the person? Through what channel? Did others receive this communication? To whom did the person convey or forward the information?

To try to help answer such questions, a number of existing search systems allow a user to extract and search e-mails. For example, some e-mail systems provide an administrator console that allows an authorized user to search a database of stored or archived e-mails by date, sender, receiver, and keywords. Some systems of this type do not have the capability to search attachments to the e-mails, where important information is often to be found. Other systems improve on the administrator console by extracting the e-mails and attachments to another repository and indexing the content there, enabling an authorized user to search both e-mail and attachments at the same time. Using systems of this kind, a user can identify all e-mails having particular keywords but must then manually review the e-mails in order to determine how information propagated through the organization, that is, to identify communication chains. Further complicating the problem is that communication chains may be direct links (e.g., an e-mail sent by user A to user B) or indirect (e.g., an e-mail sent by user A to user C, who then forwards it to user B) chains involving one or more intermediaries. A direct link can be established from a single message, but finding indirect chains generally requires correlating multiple messages.

To facilitate detection of indirect communication chains, some e-mail search systems also allow e-mails to be grouped into threads of presumptively related messages. These systems typically group messages into threads based on the subject headers and/or related-message headers that are included in most e-mail messages. For instance "Re:" and "Fw:" or similar prefixes are commonly added to subject headers to identify e-mails that reply to or forward a previous e-mail. An e-mail with a particular subject line and other e-mails whose subject lines differ only by the addition of "Re:" or "Fw:" can be grouped into a thread and organized, e.g., by time sent or time received. Related-message headers use message identifiers (e.g., serial numbers or other codes) assigned to each message, or in some systems to threads of replies and/or forwards, to identify one or more messages to which they relate. Changing the subject line when forwarding or replying to a message may defeat thread detection based on subject lines but generally does not defeat thread detection based on related-message headers.

Either of these systems, however, can be defeated (intentionally or unintentionally) if an e-mail recipient conveys the information further by some mechanism other than replying to or forwarding the received message. For instance, an e-mail recipient might compose a new e-mail message with a new subject line or pass on the information through a different channel, such as IM or voicemail. The new message will not be related to the old message in any way that a thread-based e-mail grouping system can detect. Consequently, a user who wants to reconstruct a communication chain will need to do so manually. Since message recipients often propagate received information in diverse ways, the ability of existing thread-based systems to identify communication chains is significantly compromised.

It would therefore be desirable to provide systems and methods for determining communication chains in a wider range of situations than existing systems support.

BRIEF SUMMARY OF THE INVENTION

Embodiments of the present invention provide systems and methods for analyzing a pool of messages to identify communication chains between a source and a target. In some embodiments, a message may be any electronic document that provides evidence of a communication from a sender to a recipient including but not limited to e-mail messages, instant messages, voice mail, meeting records and so on. Sender and recipient identifiers associated with each message are used to detect communication links between pairs of entities, facilitating the identification of communication chains from one or more selected sources to one or more selected targets, including both direct links and indirect chains with any number of intermediaries between the source and the target. Indirect chains of any desired length can be found, e.g., by iteratively tracing a communication path one step forward from the source, then one step backward from the target, and so on; at each new step, entities at end points of the forward paths and backward paths are compared; any entity common to both end points completes a communication chain from source to target. In some embodiments, information about communication chains is presented to a user via an interactive network graph or other interactive report, and the user can modify the report by applying a variety of filters and/or other conditions.

According to one aspect of the present invention, a method of analyzing messages includes extracting, from each of a number of messages, metadata identifying at least one sender and at least one recipient of that message, and receiving information identifying a sender of at least one of the messages as a source and identifying a recipient of at least one of the messages as a target. Using the metadata of the messages in the plurality of messages, one or more communication chains from the source to the target are determined. At least one of the communication chains is an indirect chain that includes at least one sender or recipient identified as an intermediary between the source and the target; a direct chain from the source to the target may also be identified. A representation of the one or more communication chains is stored in a memory. This representation can be transmitted to a client for display or displayed locally.

Various techniques can be used to determine the communication chains. In some embodiments, determining the one or more communication chains includes determining, based on the messages, a first set of intermediate recipients, where each member of the first set of intermediate recipients is a recipient of at least one message sent by the source. Similarly, based on the set of messages, a first set of intermediate senders is determined, where each member of the first set of intermediate senders is a sender of at least one message to the recipient. A member of the first set of intermediate recipients that is also a member of the first set of intermediate senders is identified as an intermediary.

This process can be extended to determine longer communication chains. For example, based on the set of messages, a second set of intermediate recipients can be determined, where each member of the second set of intermediate recipients is a recipient of at least one message sent by a member of the first set of intermediate recipients. A member of the second set of intermediate recipients that is also a member of the first set of intermediate senders can be identified as an intermediary. Alternatively, based on the set of messages, a second set of intermediate senders can be determined, where each member of the second set of intermediate senders is a sender of at least one message to a member of the first set of intermediate senders. A member of the second set of intermediate senders that is also a member of the first set of intermediate recipients is identified as an intermediary. A process of tracing paths alternately forward from the source and backward from the target, identifying any common intermediate senders and recipients as intermediaries in a communication chain, can be extended as far as desired.

Communication chains can be determined from a variety of message types including but not limited to electronic mail messages, voice mail messages, instant messages electronic representations of letters, electronic representations of memoranda, or messages corresponding to meetings. Messages of different types can be used in combination or separately as desired.

After determining the communication chains, additional analysis can be performed. In one embodiment, one or more user-specified filter criteria are applied to a stored representation of the communication chains to generate a filtered representation of the one or more communication chains. One example of a filter criterion is a time sequence filter applied to messages between senders and recipients in the same one of the communication chains; this filter, based on the times of individual messages, reflects whether information could have been transmitted sequentially along the links of the chain. Other types of filter criteria include a time criterion (e.g., a time window), a content criterion, an analysis context criterion, or a message-type criterion.

In other embodiments, the messages may be filtered prior to determining the communication chains, e.g., by using a filter criterion to select messages of interest, then performing the determining step on the selected messages. A combination of filtering before determining and filtering after determining can also be supported.

In some embodiments, the metadata of the messages may identify a sender (or recipient) by one of a plurality of aliases. Each of these aliases can be mapped to a common identifier, and the common identifier can be used during the act of determining the communication chains.

According to another aspect of the present invention, a method of analyzing messages includes extracting, from each of a number of messages, metadata identifying at least one sender and at least one recipient of that message and further identifying a time of each message. Information identifying a sender of at least one of the messages as a source and identifying a recipient of at least one of the messages as a target is received. Using the metadata of the messages in the messages, one or more communication chains from the source to the target are determined. At least one of the communication chains is an indirect chain that includes at least one sender or recipient identified as an intermediary between the source and the target; an indirect communication chain is determined only if the respective times of messages sent between senders and recipients in the indirect chain satisfies a time sequence constraint. A representation of the one or more communication chains is stored in a memory.

According to yet another aspect of the present invention, a system for analyzing a set of messages, the system includes an index, an interface module, and an analysis module. The index is configured to store, for each of a number of messages, metadata identifying at least one sender and at least one recipient of that message. The interface module is configured to receive input from a client and to transmit analysis results to a client. The input includes data identifying a sender of at least one of the messages as a source and further identifying a recipient of at least one of the messages as a target. The analysis module, which is communicatively coupled to the index and to the interface module, is configured to determine, using the metadata of the messages in the index, one or more communication chains from the source to the target. At least one of the communication chains is an indirect chain that includes at least one sender or recipient identified as an intermediary between the source and the target. The interface module is further configured to transmit to the client a representation of the one or more communication chains determined by the analysis module.

In some embodiments, the analysis module is further configured to store an internal representation (e.g., a network model) of the one or more communication chains to support interactive modification of the determined chains. The interface module may be further configured to receive a request from the client specifying a modification to at least one analysis parameter used in determining communication chains. The analysis module may be further configured to update the internal representation using the modification to the at least one analysis parameter. The interface module may be further configured to transmit to the client an updated representation of the one or more communication chains, with the updated representation being based on the updated internal representation.

The following detailed description together with the accompanying drawings will provide a better understanding of the nature and advantages of the present invention.

DETAILED DESCRIPTION OF THE INVENTION

Embodiments of the present invention provide systems and methods for analyzing a pool of messages to identify communication chains between a source and a target. In some embodiments, a message may be any electronic document that provides evidence of a communication from a sender to a recipient including but not limited to e-mail messages, instant messages, voice mail, meeting records and so on. Sender and recipient identifiers associated with each message are used to detect communication links between pairs of entities, facilitating the identification of communication chains from one or more selected sources to one or more selected targets, including both direct links and indirect chains with any number of intermediaries between the source and the target. Indirect chains of any desired length can be found, e.g., by iteratively tracing a communication path one step forward from the source, then one step backward from the target, and so on; at each new step, entities at end points of the forward paths and backward paths are compared; any entity common to both end points completes a communication chain from source to target. In some embodiments, information about communication chains is presented to a user via an interactive network graph or other interactive report, and the user can modify the report by applying a variety of filters and/or other conditions.

Identification of communication chains using the techniques described herein facilitates answering a variety of questions regarding information flow among individuals within an organization or other communicating entities, such as which entities had certain information, when they had it, how they came into possession of it, and where they disseminated it. In some embodiments, tools for identifying communication chains are augmented with additional document search and data extraction tools to further enhance a user's ability to find and investigate communication chains.

Figure 1:
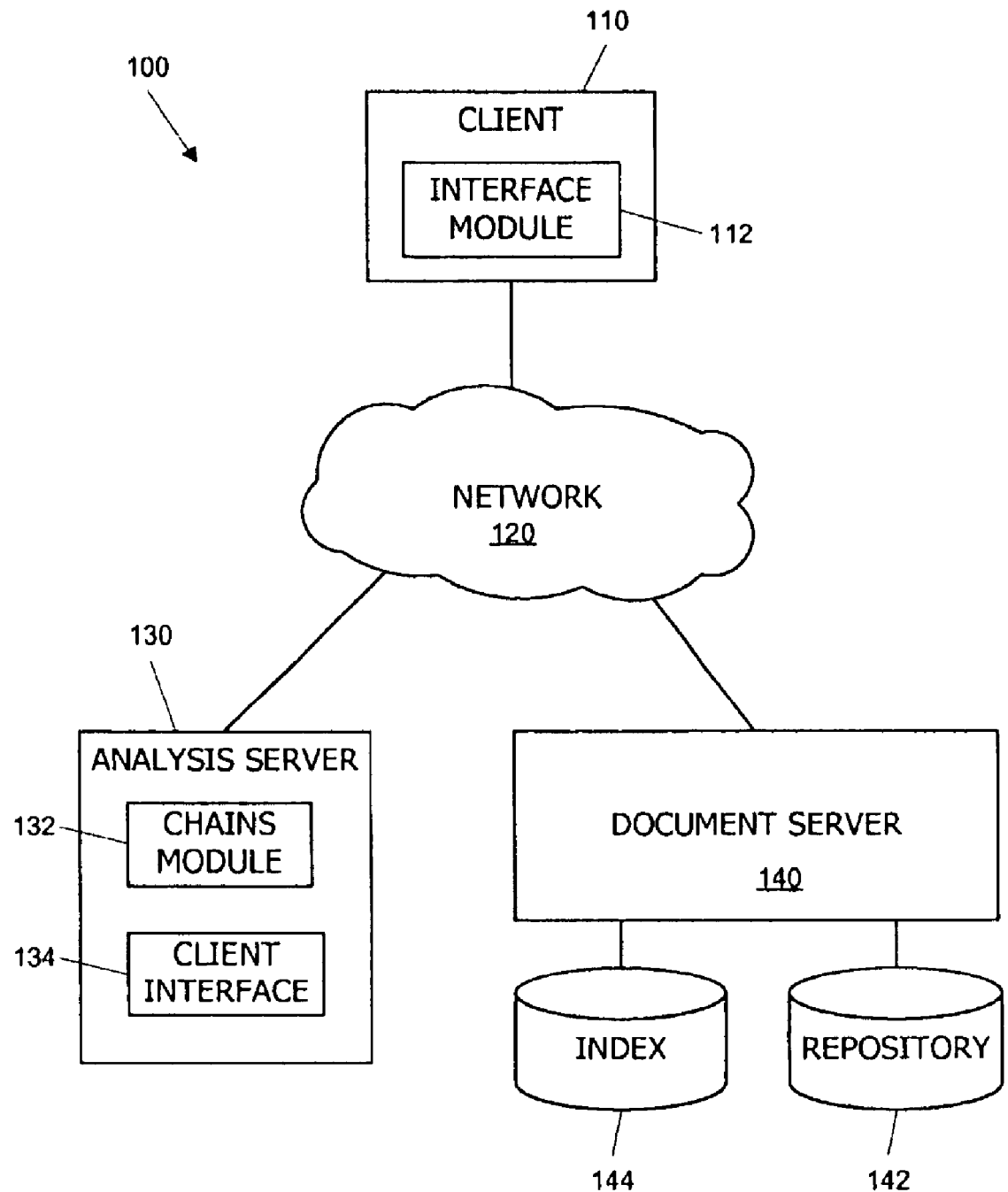
FIG. 1 is a block diagram of a network-based implementation of a document analysis system according to an embodiment of the present invention.

FIG. 1 is a block diagram of a network-based implementation of a document analysis system 100 according to an embodiment of the present invention. System 100 includes a client 110 communicatively coupled via a network 120 with an analysis server 130 and a document server 140.

Figure 2:
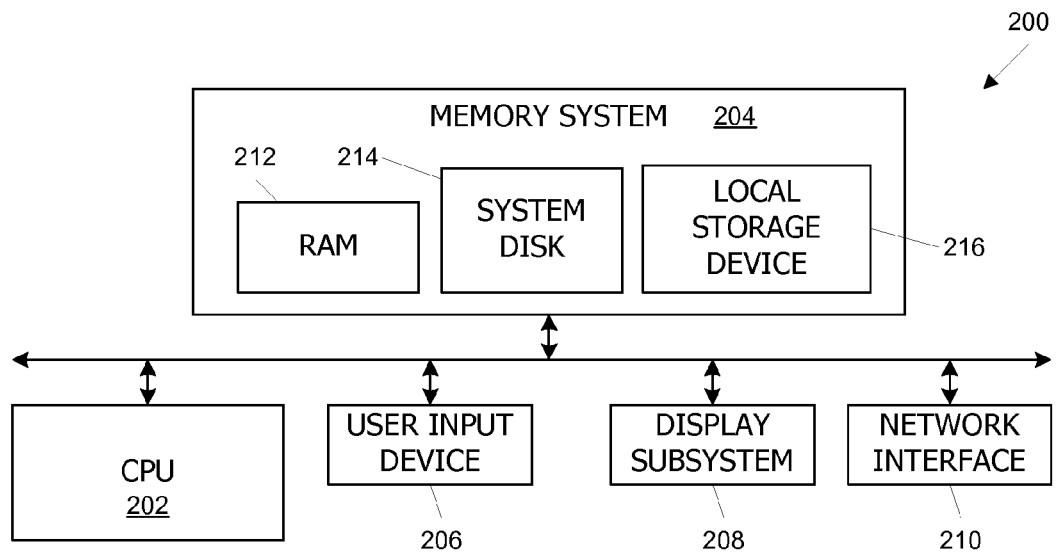
FIG. 2 is a block diagram of a computer system implementing a client computer according to an embodiment of the present invention.

Client 110 and servers 130, 140 may be computer systems of generally conventional design. For example, FIG. 2 is a block diagram of a computer system 200 implementing client computer 110 according to an embodiment of the present invention. It will be appreciated that similar computer systems could be used to implement analysis server 130 and/or document server 140.

In one embodiment, computer system 200 includes a central processing unit (CPU) 202, a memory subsystem 204, one or more user input devices 206, a display subsystem 208, and a network interface 210 interconnected by one or more buses 212. The components and their interconnections may be of generally conventional design.

CPU 202 operates in response to program code to perform a variety of data processing tasks. Memory subsystem 204 provides storage space for data and/or program code on various storage media that may form part of memory subsystem 204. One example of a storage medium includes DRAM 212, a volatile medium generally used for storing data to which relatively fast access is desired, such as program code and/or data for programs currently being executed by CPU 202. System disk 214 is a non-volatile medium (e.g., conventional magnetic disk) that can be used to store program code and also as overflow space for DRAM 212 (e.g., through conventional virtual memory and paging techniques). Local storage device 216 may support any type of volatile or non-volatile storage media, including fixed or removable media such as peripheral hard disks, floppy disks, CDs, DVDs, or flash memory devices known in the art. It is to be understood that memory subsystem 204 may store any amount and type of data desired and may include any combination of storage media.

User input devices 206 and display subsystem 208 facilitate user interaction with system 200. User input devices 206 may include, e.g., one or more of a keyboard, mouse, trackball, touch-sensitive screen, microphone, or the like. Display subsystem 208 includes a display device such as an LCD or CRT screen capable of providing visible images and may also include supporting devices such as video processors, graphics processors, video signal generators, etc. Other output devices, such as audio devices, printers or the like (not shown) may also be included in system 200.

Network interface 210 provides a coupling via which computer system 200 can communicate with other computing systems. Network interface 210 may be configured for a variety of protocols including but not limited to TCP/IP or other conventional protocols and may be implemented, e.g., as an Ethernet card, modem, wireless network adapter, or the like.

Various aspects and embodiments of the present invention can be implemented as program code executable on one or more computer systems such as computer system 200. Those skilled in the art will appreciate that a particular computer system design or form factor is not critical to the present invention; it is contemplated that the invention may be practiced in a wide variety of computer systems having different combinations of components.

Referring again to FIG. 1, network 120 may be any network supporting communication between two or more computer systems, including but not limited to the Internet, a local area network (LAN), a wide area network (WAN), a private or public network or virtual private network (VPN) or the like. Network 120 may support conventional protocols and layers such as TCP/IP, HTTP, FTP, SSL and so on. In some embodiments, secure communication channels are implemented between document server 140, analysis server 130 and/or client 110; existing security protocols or other protocols may be used to prevent unauthorized access to information stored on or transmitted between the various server and client systems. A particular network, or indeed any network, is not critical to the present invention; some embodiments allow the invention to be practiced in a single computer system or any number of distributed computer systems anywhere in the world.

Document server 140, which may be of generally conventional design, includes a document repository 142 and index 144, which may be implemented using one or more suitably configured storage devices. Document repository 142, which can be implemented, e.g., using a relational database, file system, content management system, or the like, stores a collection of electronic documents and in particular messages as described below. Each document may have associated metadata descriptive of the document such as a time when the document was created and/or added to the repository, a source of the document, indicators reflecting the type of the document (e.g., e-mail, e-mail attachment, identifier for a program usable to view the document, and so on), and any other metadata. As described below, in the case of message documents the metadata advantageously includes information identifying at least one sender (e.g., an author, e-mail sender, caller or the like) and at least one recipient.

Index 144, which can be implemented, e.g., as a relational database, text search engine, or the like, stores a representation of the documents in repository 142 in a form that facilitates search and information retrieval from repository 142. For example, index 144 may store an record for each document that includes an identifier of the document in association with the document's metadata (including sender and recipient information if the document is a message) and a searchable representation of its content.

Index 144 may also store other information about the documents in repository 142. For example, in some embodiments, reviewers of the documents can assign tags (words or short phrases descriptive of some aspect of the document or its relevance to an investigation) to a document, and the tags assigned to various documents may be stored in index 144. As another example, document server 140 may provide automated document classification techniques that group documents having similar content or relating to a similar topic according to concepts or categories. Suitable techniques are known in the art, and information as to which concepts are associated with various documents may also be stored in index 144. Document server 140 may perform various processes to update index 144 according to an update schedule or on demand; such processes may be of generally conventional nature, and a detailed description is omitted as not being critical to the present invention.

In some embodiments, document server 140 advantageously supports other functions related to populating, updating and accessing document repository 142; for instance, a user may be able to add documents to and/or remove documents from repository 142, browse documents stored in repository 142 and annotate and/or tag documents while browsing, etc. Such aspects of document server 140 are also not critical to the present invention.

Document server 140 in this embodiment communicates with analysis server 130 (e.g., directly or via network 120 or another network such as a private network) to provide information from repository 142 and/or index 144 relating to documents to be analyzed. Analysis server 130 can be configured with various modules, implemented for instance as one or more executable computer programs, to perform various analysis tasks. In particular, analysis server 130 includes a "chains" module 132 that determines communication chains using messages present in repository 142 and/or indexed in index 144.

Analysis server 130 also includes a client interface module 134 that receives and responds to input received from client computer 110. In particular, client interface 134 provides an interface via which client computer 110 can access and direct the features and operations of chains module 132 as described below. In one embodiment, client interface module 134 incorporates aspects of a conventional Web server, providing real-time interactive communication with any client computer capable of accessing the World Wide Web. Client interface module 134 may incorporate user authentication, encryption, and/or other security protocols to protect against unauthorized access to information.

As described above, client computer 110 may be of generally conventional design and may execute a variety of programs and processes. Client computer 110 advantageously includes an interface module 112 adapted to communicate with remote computers and in particular with analysis server 130. In some embodiments, interface module 112 may also be adapted to communicate with document server 140; in other embodiments, communication between client computer 110 and document server 140 is mediated by analysis server 130.

Client interface module 112 may include, e.g. a Web browser program or aspects thereof adapted to communicate with remote computers using conventional World Wide Web protocols and tools (e.g., HTTP, Secure Socket Layer, Java and/or other scripting languages, etc.). In some embodiments, the interface to analysis 130 is entirely browser-based, and client computer 110 can interact with various features of analysis server 130 and document server 140 without the need to download or install specialized application programs.

It will be appreciated that the systems described herein are illustrative and that variations and modifications are possible. For example, a document repository and/or index could be maintained as part of the analysis server rather than as a separate server. Clients and servers may be implemented on single computer systems or distributed across multiple computer systems (e.g., a server farm), and any number of client computers may be supported. Alternatively, some embodiments of the present invention can be practiced on a single computer system that need not be connected to any network or any other system.

It should also be noted that the terms "client" and "server," as used in this application and the industry, are loosely defined and, in fact, are not fixed with respect to machines or software processes executing on the machines. Typically, a server is a machine or process that is providing information and/or services to another machine or process (the "client") that requests the information and/or services. In this respect, a single computer or process can be acting as a client at one point in time (because it is requesting information) and can be acting as a server at another point in time (because it is providing information). Some computers are consistently referred to as "servers" because they usually act as a repository for a large amount of frequently-requested information and/or services, but it is to be understood that a server may also receive information from a client.

Further, although some embodiments of the present invention may benefit from having a centralized document repository (e.g., for purposes of ensuring integrity of the document corpus during ongoing document review and analysis projects), such a repository is not required. The documents may be distributed across various computers, and index 144 (or other centralized index) may store any information usable to identify and locate documents of interest wherever they may reside.

In accordance with one embodiment of the present invention, a document repository or other corpus of documents of interest includes at least some documents that are messages. As used herein, "message" or "electronic message" refers generally to any document or other record in electronic form that represents or implies a communication between two or more entities (including individuals, groups, and/or automated processes). A message can be any document or other record for which sufficient information is available to identify at least one entity as a sender of the communication (e.g., a creator, author, or transmitter) and at least one other entity as a recipient (e.g., a reviewer, editor, or receiver). The metadata associated with each message in index 144 of FIG. 1 advantageously includes respective identifiers for the sender(s) and recipient(s) thereof. Sender and recipient information may be extracted from the message during an initial stage of document processing as described below.

Any electronic document or record that represents or implies a communication from an identifiable sender to an identifiable recipient can be a message. For instance, one common form of message suitable for practicing the present invention is e-mail. An e-mail generally includes a "From" header identifying a sender (by name, e-mail address, or other alias) and some combination of "To," "CC" or "BCC" headers identifying one or more recipients (again, by name, e-mail address, or other alias). An e-mail usually also includes a body and optionally attachments. E-mails are commonly stored in databases, which may be e-mail specific databases (e.g., Microsoft Exchange, Lotus Notes) or other types of databases that are routinely backed up and/or archived; consequently, e-mail messages are likely to be accessible for purposes of message analysis.

The present invention, however is not limited to e-mail messages. Other types of messages may also be analyzed, either separately from or together with e-mails. For example, instant messages ("IMs") that have been archived or otherwise stored generally include identification of a sender and at least one recipient. Many business organizations have begun archiving IMs in response to changing legal rules, and in some embodiments, stored or archived IMs may be analyzed separately from or in conjunction with e-mails and other messages.

Voicemails can generally be identified as having a sender and a recipient. In cases where voicemails are archived, they can be transcribed to electronic document form (e.g., using existing automated speech-to-text systems and/or human transcribers) and added to a message repository. Some corporate voicemail systems log sender and recipient information (e.g., phone extensions) as metadata and/or archive the actual messages. To the extent that electronic documents representing voicemails are available, voicemails can be used as messages in embodiments of the present invention.

Paper correspondence, such as memoranda and letters, also generally identifies a sender and one or more recipients. Paper correspondence can be converted to electronic form (e.g., using existing optical character recognition systems) and added to a message repository along with metadata identifying the sender and recipient of each paper. More generally, electronic counterparts of such correspondence may also be used as messages in embodiments of the present invention.

Meetings can also be interpreted as messages. At a meeting, two or more attendees exchange information. Thus, a meeting implies mutual communication between all attendees. In some embodiments of the present invention, a meeting can be included as message (or as multiple messages) in a document repository; every attendee at the meeting is identified as both a sender of a message to each of the other attendees and as a recipient of a message from each of the other attendees. Information as to attendees and possibly what was said in a meeting can be extracted in various ways, e.g., from electronic or paper calendar entries, documents identified as meeting minutes or notes, or other records indicating that a meeting took place and who was present (and in some instances what was discussed).

Another form of communication relates to a shared document management system that allows multiple users to view and edit the same documents. Sharing a document allows exchange of information. In cases where the document management system contains information as to which users edited or viewed a document and when, corresponding messages between earlier and later editors and/or viewers can be defined.

Those skilled in the art will appreciate that messages can also be defined based on any other types of records indicative of communication, including but not limited to telephone logs, visitor logs, appointment books, notes, and the like, and that electronic messages can be created based on electronic or paper records. Accordingly, the above examples of types of messages are illustrative and not limiting.

It should be noted that a "message" as used herein might or might not contain a representation of the information communicated (referred to herein as "content"). To the extent that the messages include content, that content can be helpful to certain types of analysis, and some embodiments of the present invention make use of message content. However, for purposes of determining whether communication occurred, knowing what information was exchanged is not necessary. Accordingly, a "message" as used herein may, but is not required to, include content. For example, it might be possible to establish that a meeting took place and who attended but not what was said. The fact that the attendees communicated with each other can be represented as one or more messages that do not include content.

Figure 3:
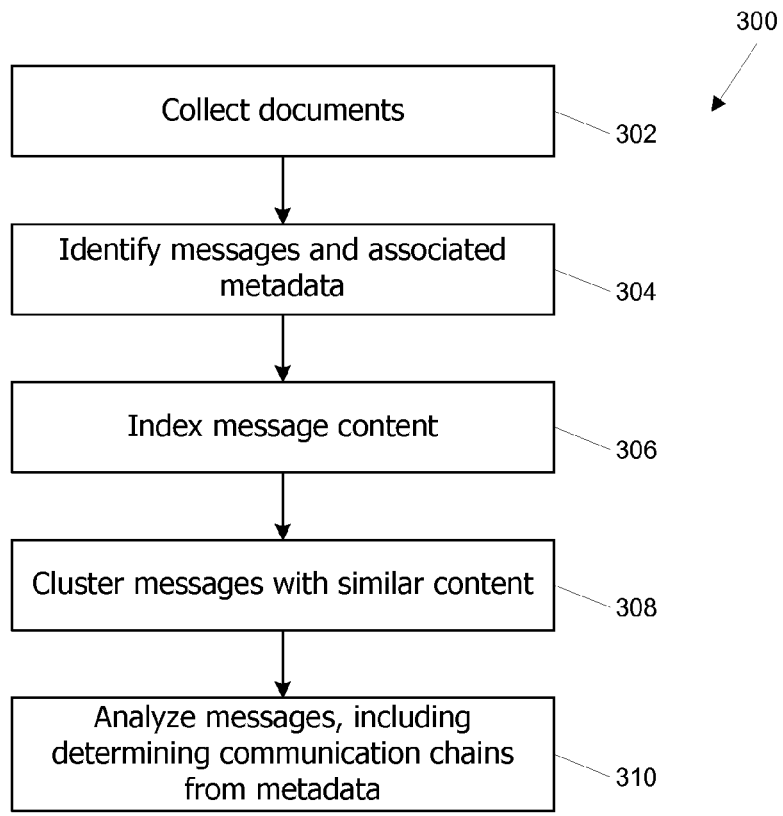
FIG. 3 is a flow diagram of a process for document analysis according to an embodiment of the present invention.

FIG. 3 is a flow diagram of a process 300 for document analysis according to an embodiment of the present invention. At step 302, documents to be analyzed, including messages, are collected, e.g., into repository 142 of FIG. 1. Collection of documents at step 302 may include human activity to identify and store documents meeting some threshold criteria into repository 142. The threshold criteria can be broadly defined, such as documents produced during discovery by one or another of the parties in a lawsuit or documents created or modified within the last three years. Documents may also be collected through automated processes, such as e-mail archiving, backups, imaging of a disk drive, or the like. Particular document collection techniques are not critical to the present invention. It is to be understood that any document or set of documents may be collected, and the collection may include documents in a variety of types and formats, such as e-mail messages or backups, application data files, PDF documents and so on.

At step 304, documents in the collection that are messages are identified, and the sender and recipient metadata is extracted. For each message, at least one sender and at least one recipient should be identified, but in some embodiments, a message may have multiple senders (e.g., in the case of meetings or letters with co-signers) and/or multiple recipients (e.g., e-mails or meetings). Other metadata may also be extracted, such as the date(s) the message was sent and/or received, subject lines, e-mail thread information, etc. The extracted metadata may be stored, e.g., in index 144 of FIG. 1.

In some embodiments, a single sender or recipient (an "entity") may have multiple identifiers. For example, one person might have multiple e-mail addresses. Where multiple types of messages are being analyzed, the problem of multiple identifiers increase. For instance, one person could have one or more e-mail addresses; a telephone number or extension (for voice mails); a name, possibly with multiple variants (for memos and letters); an IM username; and so on. In some embodiments, extraction of sender and recipient information may include a "renaming" step in which one identifier (e.g., the person's name) is selected as the canonical identifier for each communicating entity and any other identifiers ("aliases") known to correspond to the same entity are replaced or supplemented in the metadata with the canonical identifier. Renaming may involve obtaining information as to which identifiers correspond to which entities; such information might be obtained, e.g., from a telephone directory or personnel listing of the organization whose messages are being analyzed. In other embodiments, renaming is not performed or is performed for only some message types.

Another complication arises in regard to e-mails or other messages sent to a distribution list (e.g., "Marketing" or "Accounting") rather than to explicitly identified recipients. If it is known which entities were subscribed to the distribution list at the time a particular message was sent, those entities can be identified in the metadata as recipients. However, if that information is not available, identifying recipients can be difficult. In some embodiments, distribution list membership is inferred from available information, such as where e-mails to a particular list ended up. For example, if an e-mail addressed to "Marketing" is found in Jane Smith's mailbox, it can be inferred that Jane Smith was on the "Marketing" distribution list (at least at the time of that message).

At step 306, the message content (if any) is indexed. Indexing, which may be done using conventional techniques, creates a searchable representation of message content that can be stored in index 144 of FIG. 1 along with the metadata extracted at step 304. Indexing enables rapid identification of documents containing a word, phrase or combination of words that is of interest to a user and can further enhance the analysis capabilities provided by the present invention.

At step 308, messages may be clustered based on their content and/or metadata. Clustering, which may be done using conventional techniques, is an automated process that groups documents based on similarities and assists users in finding documents that are similar or related to a particular document. Information generated during clustering may be added as metadata to index 144. For instance, clustering may be used to group documents based on various concepts to which the documents relate, and the metadata added at step 308 may include identifiers of one or more concepts to which a document relates.

At step 310, the metadata in index 144 is used to analyze the messages. In accordance with an embodiment of the present invention, analyzing the messages includes identifying communication chains within the messages. The analysis process is advantageously interactive, with the user identifying senders, recipients, messages, and/or chains of interest and iteratively refining the analysis until the desired information is obtained.

Figure 4:
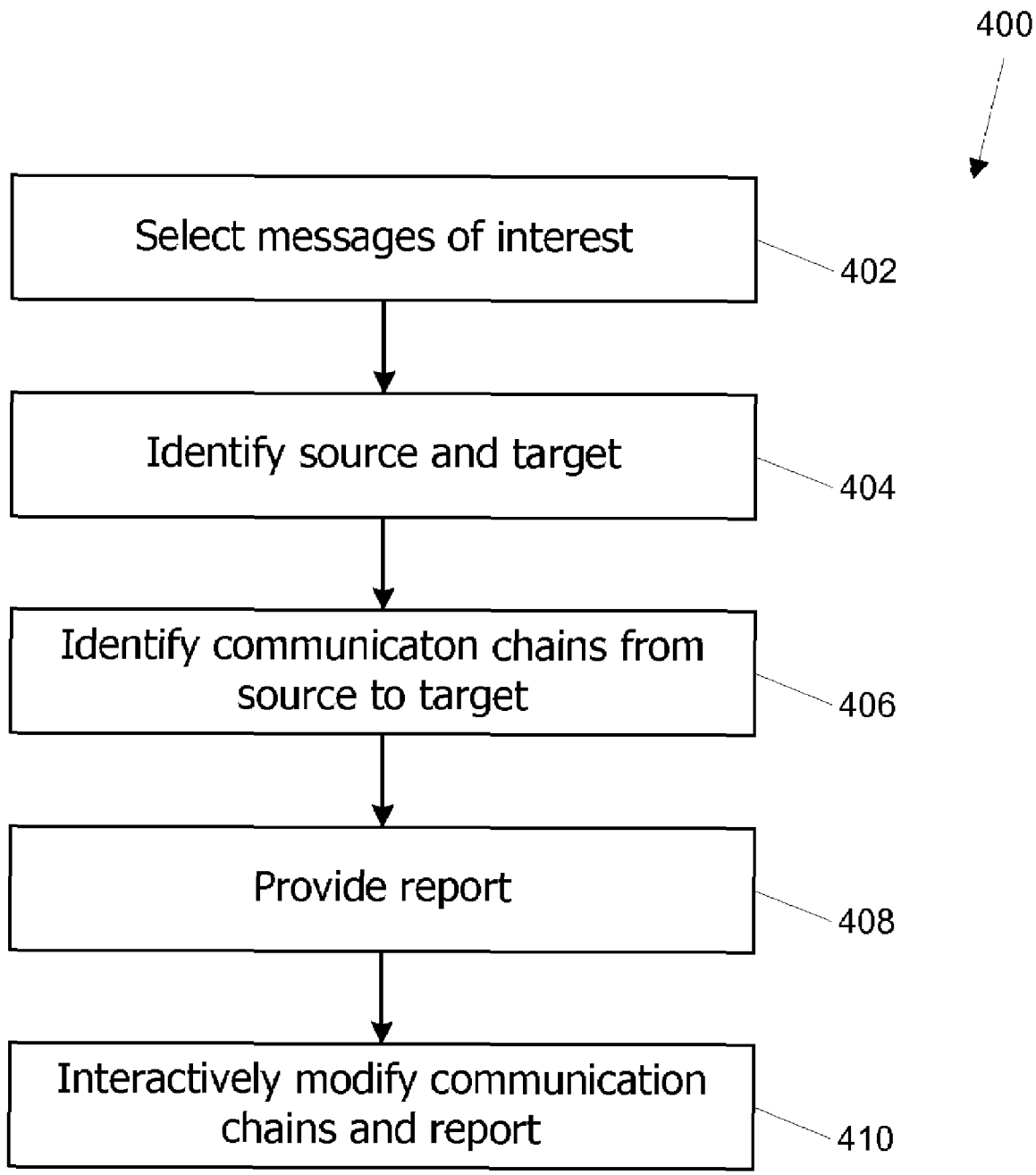
FIG. 4 is a flow diagram showing further details of an analysis process that may be performed in connection with the process of FIG. 3 according to an embodiment of the present invention.

FIG. 4 is a flow diagram of an analysis process 400 that may be performed at step 310. At step 402, messages of interest are selected. For example, the user may specify criteria defining a pool of relevant messages based on the type of information desired and the knowledge the user already has. In one embodiment, the user can define messages of interest based on one or more criteria related to time frame, content, and/or analysis context.

Time-frame criteria may specify, e.g., a date or range of dates for messages of interest. For instance, if it is known that a communication of interest could not have occurred before (or after) a certain date, the analysis can be limited to messages sent after (or before) that date. A time window having both start and end dates can be defined, and the window can be as long or short as desired.

Content criteria can be applied to messages that have content. A content criterion may be search-based, specifying words that communications of interest are expected to include. Alternatively, content criteria may rely on clustering information generated at step 308, e.g., by specifying a concept (or multiple concepts) to which the communication relates. In some embodiments, messages with no content are treated as satisfying any content criterion; in other embodiments, messages with no content are filtered out by any content criterion.

Analysis context criteria can be used where documents have previously been reviewed and annotated, tagged, grouped into folders or the like. In one embodiment, a particular tag (or tags) can be used to select only messages that tagged with that tag or to exclude such messages from the pool. Where messages are grouped into folders, one or more folders might be selected for analysis.

In some embodiments where the initial corpus can include multiple types of documents identified as messages, the user may choose to limit the analysis to messages of a selected type (or multiple types), e.g., only e-mails, only IMs, only e-mails and IMs, and so on. In one embodiment, any one available type, combination of available types, or all available types, can be selected.

The user may also elect not to apply any selection criteria at step 402, thereby selecting all messages represented in the index as the pool of messages of interest.

At step 404, the user specifies a "source" and a "target." As used herein, a "source" defines a starting point in a communication chain and participates in the chain as a sender but not as a recipient. In one embodiment, any entity that sent at least one of the messages in the pool selected at step 402 can be chosen as a source. Conversely, a "target" defines an end point in a communication chain and participates in the chain as a recipient but not as a sender. In one embodiment, any entity that received at least one of the messages in the pool selected at step 402 can be selected as a target.

At step 406, the index—or a portion thereof corresponding to the messages of interest identified at step 402—is searched to identify one or more communication chains between the source and the target. As used herein, a "communication chain" corresponds to a possible flow of information from the source through the target, and a chain may be a direct path (source sends message to target) or an indirect path involving one or more other entities as intermediaries. Messages passed from the source to the target, from the source to an intermediary, from an intermediary to the target, or between two intermediaries are referred to herein as "links" (or "hops") in the communication chain. In general, there can be any number of communication chains between a given source and a given target, and a single entity may be an intermediary in any number of the chains.

For example, suppose that at step 404, a first user (A) and a second user (B) are identified as the source and target, respectively. At step 406, possible connections from A to B are identified. If A sent a message with B as a recipient, then there is a direct link from A to B. If A did not send any messages with B as a recipient, it is still possible that there was indirect communication. For example, if A sent a message to C, who later sent a message to B, that path could have been used to convey information from A to B. The A→C→B path is a communication chain with two links (or hops): one link from A to C and another link from C to B. In principle, there could be chains with any number of intermediaries and links.

According to an embodiment of the present invention, at step 406, indirect communication chains are identified by finding recipients of messages from one entity who are also senders of messages to another entity and attempting to trace paths between the source and the target. One example of a process for identifying chains is described below with reference to FIG. 5.

It should be noted that identifying indirect communication chains by looking for commonality between selected groups of senders and recipients as described herein is more reliable than techniques that rely on explicit indicators that one message is a follow-on to a previous message (e.g., a message in an e-mail thread). For instance, suppose that C receives an e-mail from A and decides to convey the information contained in A's e-mail to B. If C forwards A's e-mail, thread-dependent techniques would likely detect the communication chain from A to B. If, however, C instead decides to compose a new e-mail to B (or send an IM or voice mail or meet with B in person), the thread information is lost, and thread-dependent techniques would not detect the communication chain from A to B.

In contrast, provided that a message corresponding to C's communication to B exists, techniques described herein would identify C as an intermediary who received a message from A and also sent a message to B. The communication chain from A via C to B would be identified, and with further investigation (e.g., automatic or manual analysis of just the messages on these two links) a user could uncover information that passed through the chain.

Referring again to FIG. 4, at step 408 a report identifying the chains that were found in step 406 is provided to the user. In one embodiment, described below with reference to FIG. 6, the report is presented as a directed network graph, with a node corresponding to each unique sender/recipient in the chain(s) and directed edges corresponding to the links between senders and recipients that make up each chain.

At step 410, the user can interact with the report to refine the analysis. For instance, as described below, the user can modify the report, extract additional information about communication patterns or communicating entities, and/or change the analysis parameters. The communication chains are modified based on user input and the report is regenerated. In the interaction stage, the report generated at step 408 can be used as a baseline for further analysis; chains included in that report can be modified in accordance with the user's input rather than repeating steps 406 and 408 to generate a new network model and report. The original report (including the underlying model of the communication chains) is advantageously saved while the user interacts with it, and the user can revert to the original report without having to repeat the search process at step 406.

Figure 5:
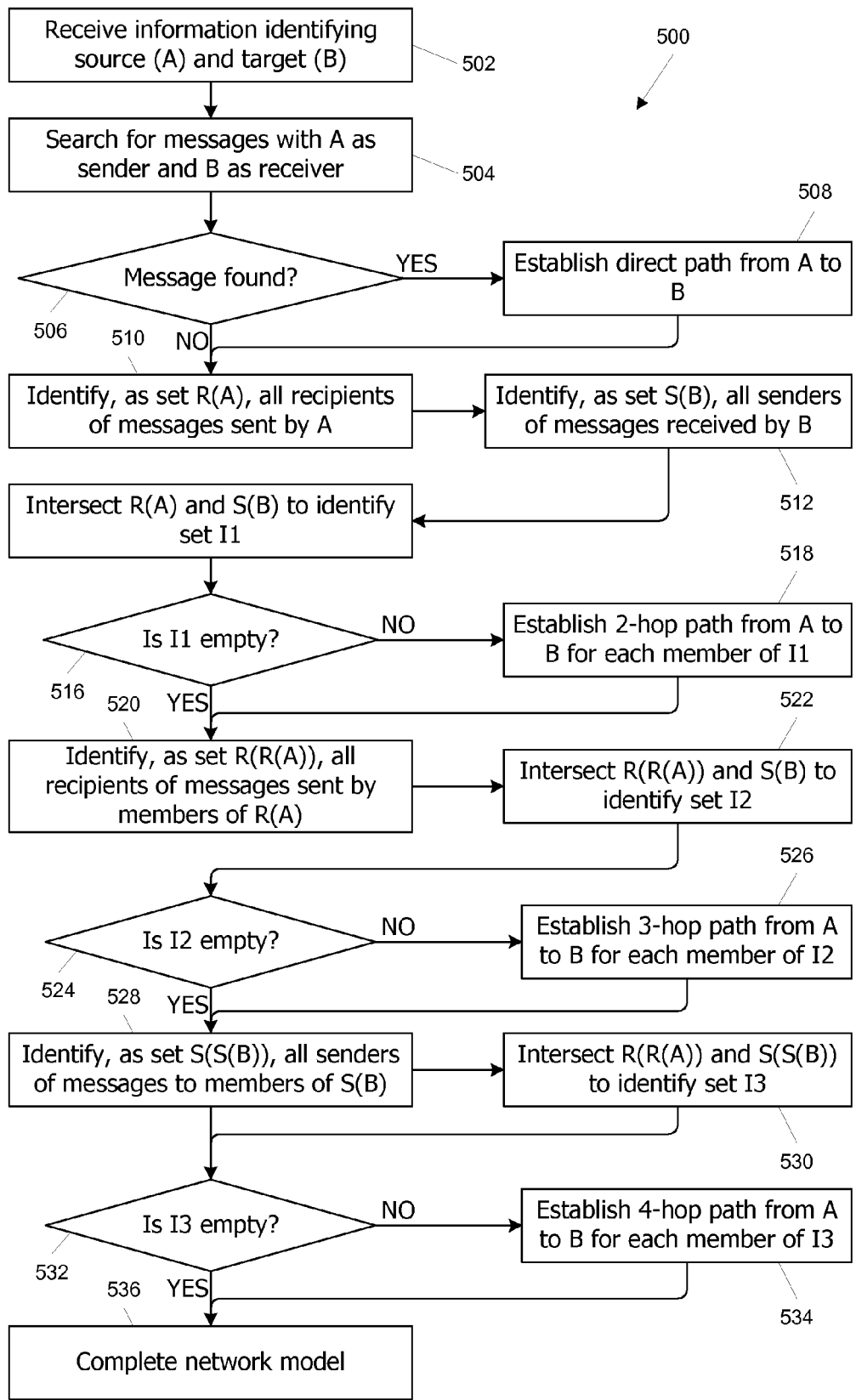
FIG. 5 is a flow diagram of a process for identifying communication chains according to an embodiment of the present invention.

FIG. 5 is a flow diagram of a process 500 for identifying communication chains according to an embodiment of the present invention. Process 500 may be used, e.g., to implement step 406 of process 400 described above, or in other contexts where it is desired to identify communication chains between a source and a target. In process 500, a direct link from source to target is found if it exists. Then, all two-link chains (or chains with one intermediary) are found. Next, all three-link chains (or chains with two intermediaries) are found, followed by all four-link chains (or chains with three intermediaries). While the described process stops after finding the four-link (three-intermediary) chains, those skilled in the art will appreciate that it can be extended to chains with any number of links or intermediaries.

Process 500 begins (step 502) when information identifying a source (e.g., entity A) and a target (e.g., entity B) is received. In one embodiment, this information is provided by a user who may, for instance, select a source from a list of all entities that sent at least one message in a pool of messages being analyzed and select a recipient from a list of all entities that received at least one message in the pool. In one embodiment, process 500 builds up a network model corresponding to the communication chain, and source A and target B are stored as the first two nodes in the network. Initially, there are no links as no chains have yet been identified.

At step 504, process 500 searches for any instance of a message that has A as a sender and B as a recipient. If one or more such message(s) are found (step 506), then a direct path, or link, from A to B is established (step 508). The link can be added to the network model. Given that communication chains are directional, any messages sent by B to A are advantageously ignored.

After completing the search for a direct link, process 500 searches for indirect chains with one intermediary. At step 510, a set R(A) consisting of all recipients of messages sent by A is identified. Herein, the notation R(X) denotes the set of all recipients who received at least one message sent by X, where X can be a single entity or set of entities. At step 512, a set S(B) consisting of all senders of messages received by B is identified, where the notation S(X) denotes the set of all senders who sent at least one message received by X, where again X can be a single entity or set of entities.

At step 514, the intersection $I1=R(A) \cap S(B)$ is determined. The set I1 may include zero or more entities, each of which is an intermediary in a chain of length 1. If set I1 is not empty (step 516), then at step 518, for each member of set I1, a two-hop path from A to B via that member of I1 is established. For example, a node corresponding to each first-level intermediary can be added to the network model, along with links from A to each first-level intermediary and from each first-level intermediary to B. As with the direct link, the number of messages sent along each link in the two-link chain may be counted and stored as a link weight.

Next, chains with two intermediaries are searched. At step 520, a set R(R(A)) consisting of all recipients of at least one message sent by any one of the recipients of messages from A is identified. At step 522, the intersection I2=R(R(A))∩S(B) is determined. The set I2 may include zero or more entities, each of which is an intermediary in a chain of length 2; some or all of these entities may also be members of set I1. If set I2 is not empty (step 524), then at step 526, for each member of set I2, a three-hop chain from A to B via that member of I2 and each member of R(A) from which that member of I2 received at least one message is established.

Establishing the three-hop chains at step 526 may include updating the network model by adding appropriate nodes and links. In one embodiment, any members of I2 that are not also members of I1 are added to the network model and linked to target node B (since all members of I2 are senders to B). Next, any members of R(A) that are not members of I1 but that did send a message to a member of I2 are identified and added to the network model. For members of R(A) that are members of I1, links to the appropriate member(s) of I2 are added.

Next, chains with three intermediaries are searched. Note that at step 520, additional intermediaries were found by advancing along possible paths from the sender toward the recipient. While it is possible to search for longer chains by continuing at each stage to advance along possible paths from the sender toward the recipient, it is often more efficient to take an alternating approach, e.g., first extending the possible paths one hop "forward" from the sender (as was done at step 520), then for the next level extending the possible paths one hop "backward" from the recipient, and so on. Process 500 uses the latter approach.

Accordingly, at step 528, a set S(S(B)) consisting of all senders of at least one message to any one of the members of S(B) is identified. At step 530, the intersection I3=R(R(A))∩S(S(B)) is determined. The set I3 may include zero or more entities, each of which is an intermediary in a chain of length 4. Some or all of the entities in set I3 may also be members of sets I2 and/or I1. If set I3 is not empty (step 532), then at step 534, for each member of set I3, a four-hop path from A to B via that member of I3 and the appropriate members of R(A) and S(B) is established. Again, the network model is updated by adding any nodes not already present and updating the links.

In this embodiment, chains with more than three intermediaries are not searched. Process 500 ends at step 536 with an optional step of completing the network model. For example, it may be useful to show all of the links between the intermediaries that have been identified. Accordingly, for each intermediary, it can be determined whether the intermediary sent messages to or received messages from another intermediary, and appropriate links can be added. This step advantageously does not add new nodes, only new links between existing nodes.

It will be appreciated that process 500 is illustrative and that variations and modifications are possible. Steps described as sequential may be executed in parallel, order of steps may be varied, and steps may be modified or combined. For example, identifying members of sets R(A) and S(B) could be done in parallel, and either identification might be made while searching for messages sent directly from A to B.

Process 500 can be used to identify indirect chains of arbitrary length by tracing communication paths forward some number of hops from the sender and backward a similar number of hops from the recipient, then looking for intersections; if the forward path intersects the backward path, then a chain is completed. The process as described herein can be incrementally extended to find chains of arbitrary length. At each stage of extension, there are one of two possibilities: either trace the forward paths one hop farther forward or trace the backward paths one hop farther backward. These two possibilities are advantageously used alternately so that for integer n>0, 2n-hop chains are found by tracing paths forward n hops from the sender and backward n hops from the recipient, then determining the intersection, while (2n+1)-hop chains might be found either by tracing paths forward n+1 hops from the sender and backward n hops from the recipient or by tracing paths forward n hops and backward n+1 hops, depending on whether it is decided to extend the trace first in the forward or the backward direction.

Process 500 may also determine additional information about the nodes and links in the communication chains. For example, in some embodiments, a count of the number of messages sent along each link might be determined and stored in the network model as a measure of link "strength." Link strength in turn can be used to determine a strength of each communication chain; for instance, the strength of a chain might be defined as the average or the minimum of its link strengths. Process 500 might also determine a weight for each intermediary, e.g., based on the total number of messages that the intermediary sent and/or received. In one embodiment, only messages sent on the links making up communication chains contribute to a node's weight; in other embodiments, all message activity at the node contributes.

In some embodiments, process 500 is performed in real time in response to a user request. In other embodiments, at least some portions of process 500 might be performed in advance and the results stored in case they are needed; for instance, to speed up the searching steps, lists of all entities that sent messages to a particular entity and of all entities that received messages from a particular entity can be generated in advance. A master list of all senders of at least one message and a corresponding list of all recipients of at least one message might also be made in advance and can be used, e.g., to assist a user in selecting a source and a target.

Figure 6:
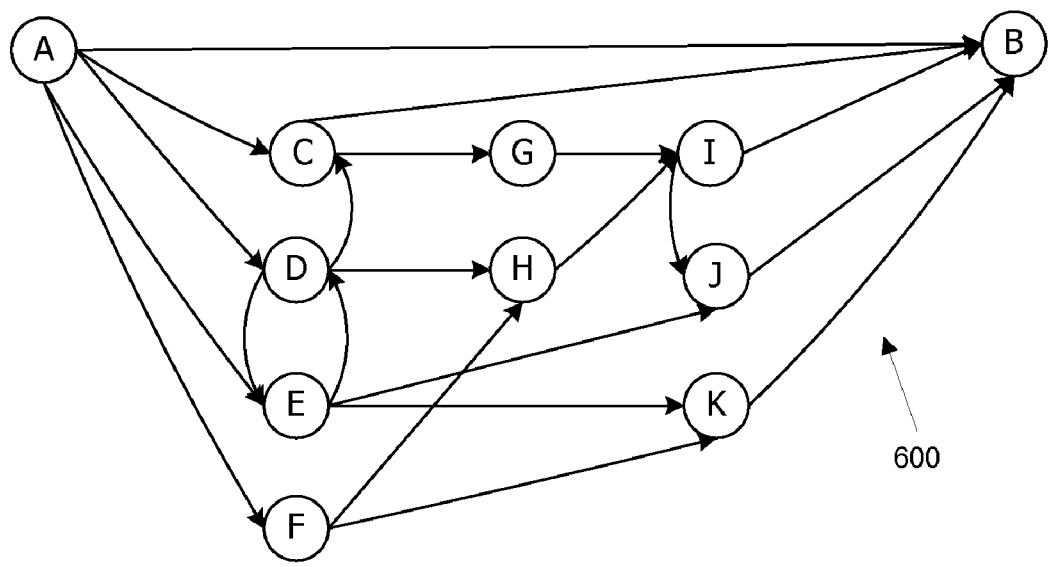
FIG. 6 is a network graph illustrating communication chains that can be presented to a user according to an embodiment of the present invention.

In accordance with another aspect of the present invention, information related to communication chains determined in process 500 or other processes is advantageously presented to a user in an interactive, easy-to-understand format. For example, FIG. 6 is a network graph (or map) 600 illustrating communication chains between a source A and a target B that can be presented to a user according to an embodiment of the present invention. The communicating entities are represented by nodes (e.g., circles) and include source A and target B, as well as the intermediaries C-K. The message paths connecting the entities are represented as directed edges (arrows) indicating the direction of information flow.

Graph 600 incorporates several features that can enhance user comprehension of the information therein. For instance, the source and target (nodes A and B) are placed at opposite ends of the graph, so that communication chains flow generally from left to right. It is to be understood that alternative arrangements, e.g., chains moving from top to bottom or bottom to top, may be equally effective.

Additionally, the intermediary nodes are arranged according to a level (or degree) of separation from the source. Nodes at the same level are arranged approximately in a column, with first-level nodes (C-F) being closest to the sender, second-level nodes (G-H) being to the right of the first-level nodes and so on. Within each level, nodes can be ranked, e.g., according to node weight as defined above. Thus, it can easily be seen how different intermediary nodes relate to the source and/or target. In other embodiments, nodes could be arranged according to level of separation from the target, and the user may specify whether to calculate levels with reference to the source or the target.

The links shown can also be limited to links that are relevant to the communication chains from the source to the target. In FIG. 6, each arrow corresponds to either (a) a link from a node at one level to a node at a level closer to the recipient or (b) a link between two nodes at the same level. The former are shown as straight lines and the latter as curved lines, making the two types of message flows relatively easy to distinguish. Links from a node at one level to a node at a level closer to the sender are not shown. (In some embodiments, a user may be able to choose whether to have such links displayed.)

Other variations may also be supported. For instance, nodes might be depicted as icons with entity names (or other entity identifiers), icons without entity names, entity names without icons, and so on. Additional information can also be displayed, such as the strength of each link and/or the weight of each node. In some embodiments, chain strength can also be indicated for each chain. The user interface may include one or more toggles or other controls operable by a user to specify what information should or should not be displayed.

In addition, the display need not be a network graph. A dynamic display that shows the messages propagating along the links might be used. Heat maps (e.g., based on node strength or link weight) or other representations might also be used. More generally, any representation that shows a user which entities communicated to which other entities making up the chains may be used.

In some embodiments, a network graph (e.g., graph 600) or other representation of the communication chains is presented to the user as part of a graphical user interface supporting interactive analysis of communication chains and messages. The nodes and links of graph 600 (or corresponding elements in another representation) may be interface elements; for instance, a user might be able to click on a node or link (e.g., using a conventional computer mouse or the like) and obtain additional information about that node or link.

In one embodiment, clicking on a node in graph 600 allows the user to select and view various node-identifying information such as the name, e-mail address(es), phone number or any other entity identifiers associated with that node. The user may also be able to view details about the node's (or entity's) communication behavior, such as the number of messages received and/or sent (which can further be broken down by message type, such as e-mail, voice mail, IM, etc.). The user may also be able to retrieve a list of senders to that node and the number of messages received from each such sender and/or a list of recipients from that node and the number of messages sent to each such recipient. These lists may but need not be limited to the senders and recipients included in the network graph; they may be generated using the message pool of interest or all available messages. In some embodiments, the user can also select a node and obtain a list of messages received and/or sent by that node; the user may then browse the actual messages. Such lists and numbers can optionally be broken out by message type.

Similarly, clicking on an edge in graph 600 might allow the user to view information about the link, such as the number of messages sent, the dates (including times) of messages sent, and/or a list of the messages sent. The user may also be able to download or browse the messages associated with a particular link.

In some embodiments, the user may also be able to rearrange the nodes on the display, e.g., by clicking and dragging on a node to reposition it. The link lines are automatically adjusted as (or after) nodes are repositioned so that the correct connections are still displayed. Thus, rearranging nodes is a cosmetic alteration that may help the user understand certain aspects or features of the network more clearly but does not alter the network connectivity.

In other embodiments, the user does modify the network model, e.g., by adjusting analysis parameters as noted above with reference to step 410 of FIG. 4. Graph 600 can be updated in substantially real time to reflect user-requested changes in the analysis or display parameters. The user can modify these parameters in a variety of ways.

For example, although the messages may have been pre-filtered in some way prior to identifying the communication chains (e.g., at step 402 of process 400 as described above), the user may decide after seeing the network graph that additional filtering is desired. Various filters can be applied. For instance, any of the time filters, content-based filters, analysis-context-based filters and/or message-type filters described above could be applied at this stage as well.

Another type of filter that is advantageously applied after generating a network graph is a chronology, or time-sequence, filter. The time sequence filter allows the user to focus on chains along which a particular piece of information could plausibly have traveled. It is premised on the assumption that receiving information is a prerequisite for sending that information. (While this is a reasonable assumption, it is also possible that entities in the network might have communicated with each other without creating any record that could be used as a message. Allowing chains with links out of temporal sequence may be an avenue toward detecting such off-the-record communications, and accordingly, a time-sequence filter is optional.)

In one embodiment, the time-sequence filter enumerates (e.g., generates a list of) all the possible chains from the source to the target, then processes each chain in turn. At each link, it is determined when the earliest message was sent. At the next link, any messages sent prior to the earliest time of a message on the preceding link are filtered out. In another embodiment, the time-sequence filter determines the time of the first message (from any sender in the network model) to reach a particular recipient and filters out any messages sent by that recipient prior to that earliest time. Other implementations are also possible.

After applying any of these filters to the network model, an updated network graph is displayed. Analysis server 130 advantageously saves the originally generated network model for at least as long as the analysis session is in progress so that the user can revert back to it at any time without having to wait for the model to be regenerated. Updated models can be saved as well.

Figure 7A:
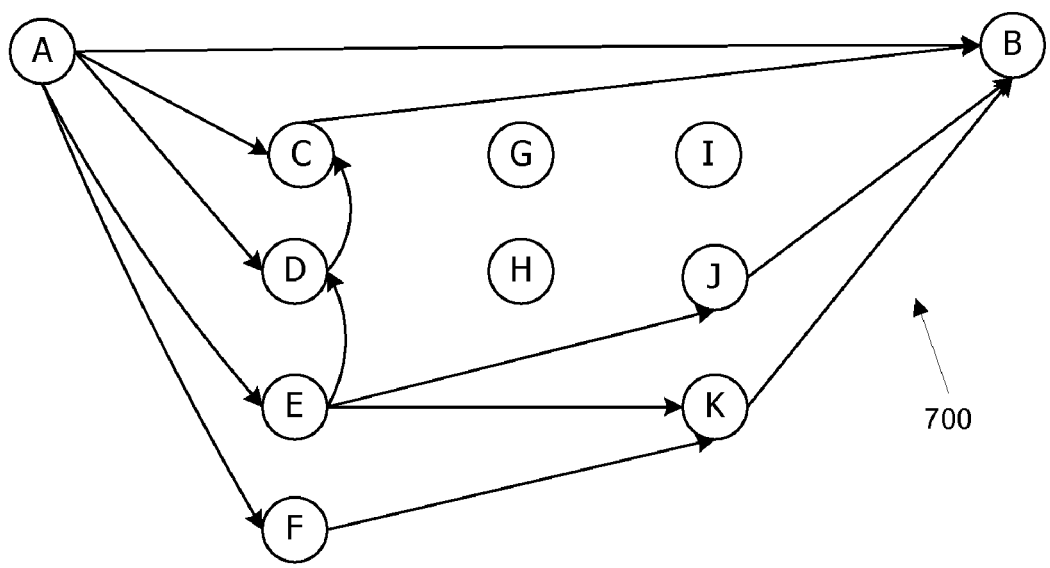
FIGS. 7A and 7B are network graphs illustrating modifications to the network graph of FIG. 6 in accordance with embodiments of the present invention.

An example of an updated network graph is shown as graph 700 in FIG. 7A. In this example, graph 700 is identical to graph 600 except that a filter (e.g., a time sequence filter) has been applied, resulting in the removal of some of the links. For example, suppose that a time-sequence filter applied to graph 600 of FIG. 6 determined that no messages were sent from node I to target node B after the time of earliest message to arrive at node I. The link connecting I to B would be removed by the filter. In addition, links going into node I (e.g., the links from nodes G and H) would no longer be part of any communication chain, so those links could also be removed by the filter. Next, since node I has no inbound links, its outbound links to nodes other than B would also not be part of a communication chain and would also be removed. Applying similar logic at other nodes, graph 700 can be generated from graph 600.

Unlike graph 600, graph 700 has "orphan" nodes, i.e., nodes that do not connect to other nodes. In one embodiment, a user interface control is provided that allows the user to control whether orphan nodes are displayed (as in graph 700) or hidden. In other embodiments, orphan nodes are automatically removed when filters are applied.

Still another type of filter might allow the user to specify a maximum number of intermediaries. In one embodiment, the initial identification of communication chains is done using an upper limit on chain length (or number of intermediaries) that cannot be increased but can be decreased in this "post-filtering" stage.

It should be noted that the upper limit on chain length used during initial identification of communication chains can be chosen to be a relatively large number such that users are unlikely to be interested in longer chains. "Relatively large" in this context might be, e.g., in the range 4-6. One theory holds that at six degrees of separation, any two people can be connected. If this is correct, then a model including all chains with more than five intermediaries would include everyone in an organization, and that may reduce the usefulness of the model as an analysis tool. However, the "six degrees" theory might not be correct, and the upper limit could theoretically be set to any number desired.

Yet another type of filter is based on level of activity at a node or link. For instance, a user could filter the model based on link strength or chain strength (e.g., removing any links or chains below a user-specified threshold strength). Related filters could be based on node weight, allowing the user to filter out nodes with too little (or too much) activity. Other filters might be based on the number of distinct recipients for a particular sender and/or the number of distinct senders for a particular recipient. Those skilled in the art will be able to identify additional types of filters that could be used.

Figure 7B:
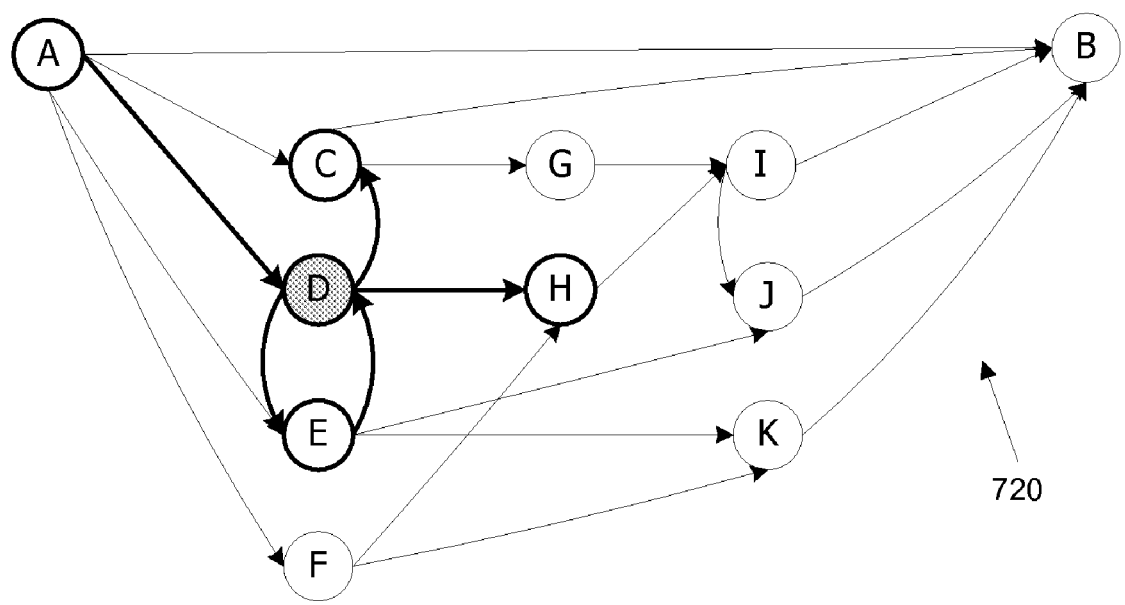

Apart from filtering, the user may also want to focus the analysis on a specific node. As noted above, the user in some embodiments can click on or otherwise select a node and obtain further information about that node. In a related embodiment, when the user selects an intermediary node, the display changes to show a "star" representation that highlights the links going into and/or out of that node. FIG. 7B illustrates a network graph 720 corresponding to graph 600 of FIG. 6 except that node D is shown in a star representation. Node D and the links into and out of node D are highlighted to stand out, while other nodes and links are fainter. As can be seen, the star representation focuses the user's attention on the role of node D in the network, giving the user another tool for understanding the information contained in the network graph.

Those skilled in the art will recognize that various types of highlighting, including but not limited to size, color, and the like can be used to create a star representation. In one embodiment, links into the node are highlighted in one color (e.g., red) while links out of the node are highlighted in a different color (e.g., blue). Links and/or nodes not directly connected to the central node of the star representation can be faded or entirely hidden. A user may also be able to specify a number of degrees of separation forward and/or backward from the central node to which the "star" should extend.

In some embodiments, a user can also fine-tune an analysis by removing one or more intermediary nodes from the graph. The graph is regenerated as if the removed intermediaries had not sent or received any messages, which may result in the removal of other intermediaries as well. For instance, in graph 600, removing node I would result in the removal of nodes G and H as well, since neither of these nodes is included in a communication chain that does not also include node I. Removing a node is useful, e.g., if the user has established that no communications of interest were received and/or sent by that node.

In another embodiment, the user can add an intermediary to the graph. For instance, the user may be presented with a list of all entities that are both senders and recipients (any entity that is not both a sender and a recipient cannot be an intermediary and so can be excluded from the list of options). The user selects one or more entities from the list, and the selected entity is added to the network model, e.g., by finding at least one chain from the source to the target that includes the selected entity as an intermediary. When adding a user-selected intermediary, at least the shortest chain from the source to the target that includes that intermediary is advantageously found, regardless of length; if no chain is found at any length, this information is reported to the user. Chains not involving the added intermediary advantageously remain restricted to the applicable maximum length (so that the entire model does not have to be regenerated). In some cases, one or more nodes other than the user-added intermediary (or intermediaries) may also need to be added to the model in order to complete a chain that includes the user-added intermediary. Once the model is updated, graph 600 can be redrawn to show the relationship of the user-added intermediary to the rest of the nodes.

It will be appreciated that the user interface and interactive analysis techniques described herein are illustrative and that variations and modifications are possible. Different embodiments of the invention may include all, some or none of the particular interface elements and analysis options described herein and may also add other features not explicitly described. For instance, the user interface may provide controls allowing the user to print network graphs or other reports related to communication chains (e.g., any of the lists of senders, lists of recipients, or lists of messages described above). Another interface control may be provided via which the user can instruct analysis server 130 to save a network graph and associated model or to retrieve a previously saved graph and model, allowing the user to return to analysis work in progress. Analysis server 130 advantageously saves the original model along with a modified model and/or other information identifying any filters, added or removed nodes, or various other changes that the user has currently applied to the original model In some embodiments, analysis server 130 might save a step-by-step record of an entire analysis session, allowing the user to return to any point in the session.

While the invention has been described with respect to specific embodiments, one skilled in the art will recognize that numerous modifications are possible. For instance, although embodiments described herein may make reference to determining, identifying and/or analyzing communication chains connecting a single source to a single target, those skilled in the art will appreciate that the invention also has application to determining communication chains connecting one source to each of multiple targets, each of multiple sources to a single target, and/or any one of multiple sources to any one of multiple targets.

Embodiments of the invention may be adapted to use a variety of message types (e.g., e-mail, IM, voice mail, meetings, etc.) in combination or separately. Those skilled in the art will appreciate that support for multiple message types is not required and that some embodiments may use messages of only one type (e.g., only e-mail).

Embodiments of the present invention may be practiced in an wide variety of computer systems, including standalone systems and networked systems in a range of configurations, and these systems need not have every feature described herein. For instance, those skilled in the art will recognize that for purposes of constructing communication chains, it is not necessary to maintain a repository of documents or messages; all that is needed is metadata identifying senders and recipients of the messages of interest. For additional operations where documents are accessed (such as providing documents associated with a node or link to users for review), it is also not necessary to maintain the documents in a central repository, provided that the user can be reliably directed to the documents of interest (e.g., via Web-style URLs or other unique location identifiers). One advantage of a centralized document repository is that it may afford users and/or system operators more control over the collection of messages to be analyzed, but it is not required, and any collection of documents that includes at least some messages can be analyzed in accordance with various embodiments of the present invention.

In some embodiments, the analysis module and user interface components described herein may reside on the same computer system or different computer systems. Other embodiments may embed or incorporate analysis module and/or user interface components into an application program that interfaces to a message database (e.g., Microsoft Outlook, Lotus Notes), supporting analysis of messages sent and/or received using that application program.

Embodiments of the present invention can be used in a range of fields and investigative contexts where information about communication patterns within an organization or group of users is desirable. Examples include civil litigation (where extensive electronic document discovery is usually available), criminal investigations, internal corporate investigations that may be undertaken based on actual or suspected wrongdoing or for regulatory compliance purposes in the routine course of business, or studies of communication patterns aimed at improving information flow within the organization.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download). In some implementations, most or all of the program code may reside on application server 130, accessible to client computer 110 via a conventional Web browser or the like. Thus, although the invention has been described with respect to specific embodiments, it will be appreciated that the invention is intended to cover all modifications and equivalents within the scope of the following claims.

What is claimed is:

1. A method of analyzing messages, the method being implemented in a computer system having a processor and a memory, the method comprising:
   extracting, by the processor, from each of a plurality of messages, metadata identifying at least one sender and at least one recipient of that message;
   generating from the metadata, by the processor, a list of senders of messages and a list of recipients of messages, wherein each sender is identified as the sender of at least one of the plurality of messages and each recipient is identified as the recipient of at least one of the plurality of messages;
   receiving, by the processor, information selecting one of the senders from the list of senders as a source and one of the recipients from the list of recipients as a target;
   determining, by the processor, using the metadata of the messages in the plurality of messages, one or more communication chains from the source to the target, wherein at least one of the communication chains is an indirect chain that includes at least one sender or recipient identified as an intermediary between the source and the target, wherein the determining includes:
      extending a first possible message path one link forward from the sender, thereby defining an intermediate sender set, or extending a second possible message path one link backward from the recipient, thereby defining an intermediate recipient set;
      after extending one of the first or second possible message path, detecting an overlap between one or more entities in the intermediate sender set and one or more entities in the intermediate recipient set, wherein a communication chain is completed in the event that the overlap is found; and
      repeating the extending and detecting until a maximum communication chain length is reached; and
   storing, by the processor, a representation of the one or more communication chains in the memory.

2. The method of claim 1 further comprising:
   transmitting the representation of the at least one communication chain to a client.

3. The method of claim 1 wherein determining the one or more communication chains includes:
   determining whether the set of messages includes at least one direct message having the source as a sender and the target as a recipient; and
   in the event that the set of messages includes at least one direct message, including in the one or more communication chains a direct path from the source to the target.

4. The method of claim 1 wherein the plurality of messages includes messages of at least one type selected from a group consisting of electronic mail messages, voice mail messages, instant messages electronic representations of letters, electronic representations of memoranda, and messages corresponding to meetings.

5. The method of claim 1 wherein the set of messages includes a message corresponding to a meeting and wherein each participant in the meeting is identified as both a sender and a recipient of the message corresponding to the meeting.

6. The method of claim 1 further comprising:
   receiving one or more filter criteria to be applied to the one or more communication chains determined during the act of determining; and
   using the one or more filter criteria and the stored representation to generate a filtered representation of the one or more communication chains.

7. The method of claim 6 wherein the one or more filter criteria include a time sequence filter applied to messages between senders and recipients in the same one of the communication chains.

8. The method of claim 6 wherein the one or more filter criteria include one or more of a time criterion, a content criterion, an analysis context criterion, or a message type criterion.

9. The method of claim 1 wherein the metadata identifies a sender by one of a plurality of aliases, the method further comprising:
   mapping each of the plurality of aliases to a common identifier; and
   using the common identifier during the act of determining the communication chains.

10. The method of claim 1 further comprising:
   selecting a subset of the plurality of messages according to one or more filter criteria,
   wherein the act of determining is performed using only messages in the selected subset.

11. The method of claim 10 wherein the one or more filter criteria include one or more of a time criterion, a content criterion, an analysis context criterion, or a message type criterion.

12. A method of analyzing messages, the method being implemented in a computer system having a processor and a memory, the method comprising:
   extracting, by the processor, from each of a plurality of messages, metadata identifying at least one sender and at least one recipient of that message and further identifying a time of each message;
   generating from the metadata, by the processor, a list of senders of messages and a list of recipients of messages, wherein each sender is identified as the sender of at least one of the plurality of messages and each recipient is identified as the recipient of at least one of the plurality of messages;
   receiving, by the processor, information selecting one of the senders from the list of senders as a source and selecting one of the recipients from the list of recipients as a target;
   determining, by the processor, using the metadata of the messages in the plurality of messages, one or more communication chains from the source to the target, wherein at least one of the communication chains is an indirect chain that includes at least one sender or recipient identified as an intermediary between the source and the target, wherein the determining includes:
      extending a first possible message path one link forward from the sender, thereby defining an intermediate sender set, or extending a second possible message path one link backward from the recipient, thereby defining an intermediate recipient set;
      after each extension of either the first or second possible message path, detecting an overlap between one or more entities in the intermediate sender set and one or more entities in the intermediate recipient set, wherein a communication chain is completed in the event that the overlap is found; and
      repeating the extending and detecting until a maximum communication chain length is reached,
   wherein an indirect communication chain is determined only if the respective times of messages sent between senders and recipients in the indirect chain satisfies a time sequence constraint; and
   storing, by the processor, a representation of the one or more communication chains in the memory.

13. A system for analyzing a set of messages, the system comprising:
   a data storage device configured to store, for each of a plurality of messages, an index including metadata identifying at least one sender and at least one recipient of that message;
   a processor communicatively coupled to the data storage device, the processor including an interface module and an analysis module,
   the interface module being configured to receive input from a client and to transmit analysis results to a client, the input including data identifying a sender of at least one of the plurality of messages as a source and further identifying a recipient of at least one of the plurality of messages as a target,
   the analysis module being configured to determine, using the metadata of the messages in the plurality of messages, one or more communication chains from the source to the target, wherein at least one of the communication chains is an indirect chain that includes at least one sender or recipient identified as an intermediary between the source and the target, and wherein the analysis module is configured such that the determining includes:
      extending a first possible message path one link forward from the sender, thereby defining an intermediate sender set, or extending a second possible message path one link backward from the recipient, thereby defining an intermediate recipient set;
      after each extension of either the first or second possible message path, detecting an overlap between one or more entities in the intermediate sender set and one or more entities in the intermediate recipient set, wherein a communication chain is completed in the event that the overlap is found; and
      repeating the extending and detecting until a maximum communication chain length is reached,
   the interface module being further configured to transmit to the client a representation of the one or more communication chains determined by the analysis module.

14. The system of claim 13 wherein the computer system further comprises a memory and wherein the analysis module is further configured to store an internal representation of the one or more communication chains in the memory.

15. The system of claim 14 wherein the internal representation comprises a network model.

16. The system of claim 14 wherein:
   the interface module is further configured to receive a request from the client specifying a modification to at least one analysis parameter used in determining communication chains;
   the analysis module is further configured to update the internal representation using the modification to the at least one analysis parameter; and
   the interface module is further configured to transmit to the client an updated representation of the one or more communication chains, the updated representation being based on the updated internal representation.

17. The system of claim 13 wherein the representation transmitted to the client is a network graph.

18. The system of claim 13 wherein the index comprises a relational database storing the metadata and wherein the analysis module is further configured to determine the one or more communication chains at least in part by searching in the relational database.

19. The method of claim 1 wherein repeating the extending and detecting includes alternately extending the first possible message path and extending the second possible message path.

20. The method of claim 1 wherein the determining includes determining all communication chains from the source to the target that have less than or equal to a maximum number of intermediaries.

21. The method of claim 12 wherein repeating the extending and detecting includes alternately extending the first possible message path and extending the second possible message path.

22. The method of claim 12 wherein the determining includes determining all communication chains from the source to the target that have less than or equal to a maximum number of intermediaries.

23. The system of claim 13 wherein the analysis module is further configured such that repeating the extending and detecting includes alternately extending the first possible message path and extending the second possible message path.

24. The system of claim 13 wherein the analysis module is further configured to determine all communication chains from the source to the target that have less than or equal to a maximum number of intermediaries.

* * * * *

UNITED STATES PATENT AND TRADEMARK OFFICE
CERTIFICATE OF CORRECTION

PATENT NO. : 7,664,821 B1 Page 1 of 1
APPLICATION NO. : 11/627886
DATED : February 16, 2010
INVENTOR(S) : Ancin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this

Twenty-eighth Day of December, 2010

David J. Kappos
*Director of the United States Patent and Trademark Office*